Sept. 9, 1952 LE ROY MOFFETT 2,610,260

SIGNAL GAIN CONTROL CIRCUITS

Filed Dec. 31, 1946 2 SHEETS--SHEET 1

INVENTOR
LE ROY MOFFETT
BY H. S. Grover
ATTORNEY

INVENTOR
LE ROY MOFFETT
BY W. S. Grover.
ATTORNEY

Patented Sept. 9, 1952

2,610,260

UNITED STATES PATENT OFFICE 2,610,260

SIGNAL GAIN CONTROL CIRCUITS

Le Roy Moffett, Tarrytown, N. Y., assignor to Radio Corporation of America, a corporation of Delaware Application December 31, 1946, Serial No. 719,403

2 Claims. (Cl. 179—171)

This invention relates to signal gain control, and more particularly to improved video gain control systems.

The control of gain in electric signal transmission circuits for control of various effects has become increasingly important with the advent of television and its numerous requirements for stage effects demanded by the public as a result of the highly perfected and successful technical control exercised in present day motion pictures.

It often becomes important in the transmission of broad band signals that distortion due to direct current surges resulting from rapid changes in gain or instantaneous switching between channels be reduced to a minimum because such surges change the information present in such signals. This becomes particularly important in the transmission of video signals which employ wide frequency bands including low frequency component as low, for example, as the field repetition frequency.

It will be understood that the image signal must convey information both as to the instantaneous amplitude which corresponds to the brightness of the image element scanned at the instant or the instantaneous aspect of the signal; and the image signal must also include an average value that corresponds to the average illumination of the scene. This may be termed as the steady-state aspect of this image signal, and is usually referred to as the D.-C. component. The instantaneous and D.-C. components of the image signal may vary independently of one another. The instantaneous component provides the detailed information, while the D.-C. component provide background information. For example, a given scene superimposed on a bright background gives the impression of sunlight, brightness and warmth, while the same details superimposed on a dark background may convey the impression of moonlight, darkness and cold. The latter provides an exactly opposite effect on the image, although the detail remains substantially the same.

Such an effect may be undesirable in connection with the changing in gain or fading between images or switching from one video channel to another.

According to this invention, a signal gain control circuit is provided wherein rapid changes in gain or switching between channels can be provided without objectionable D.-C. surges or change in the average output voltage of the system.

The primary object of this invention is to provide an improved gain control circuit for the transmission of signals involving low frequencies and slowly changing direct current components.

Another object of this invention is to provide an improved television system wherein distortion resulting from direct current surges caused by rapid changes in gain or switching is reduced to a minimum.

Other and incidental objects of the invention will be apparent to those skilled in the art from a reading of the following specification and an inspection of the accompanying drawing in which Figure 1 shows by circuit diagram one preferred form of this invention involving a single channel circuit having a constant average value output voltage;

It is well known that voltage variations on the grid of a tube have much greater effect on the plate current than do changes in plate voltage. When a resistance or other impedance is placed in series in the plate circuit, the voltage drop across it, which is a function of the plate current flowing through it, is controlled by the grid voltage. A small change in grid voltage causes a large change in voltage across the load, in other words, the grid voltage is amplified in the plate circuit.

The characteristics of vacuum tubes with cathode, grid and plate elements involve the relationships between grid voltage, plate current and plate voltage. The measure of the amplification of which a tube is capable is known as its amplification factor and is the ratio of plate voltage change to the grid voltage change $$\mu=-\left(\frac{dE_p}{dE_g}\right) I_p \text{ constant}$$

where $\mu$ is amplification factor
$E_p$ is plate voltage
$E_g$ is grid voltage
$I_p$ is plate current.

Figures 1, 2, 3, 4:
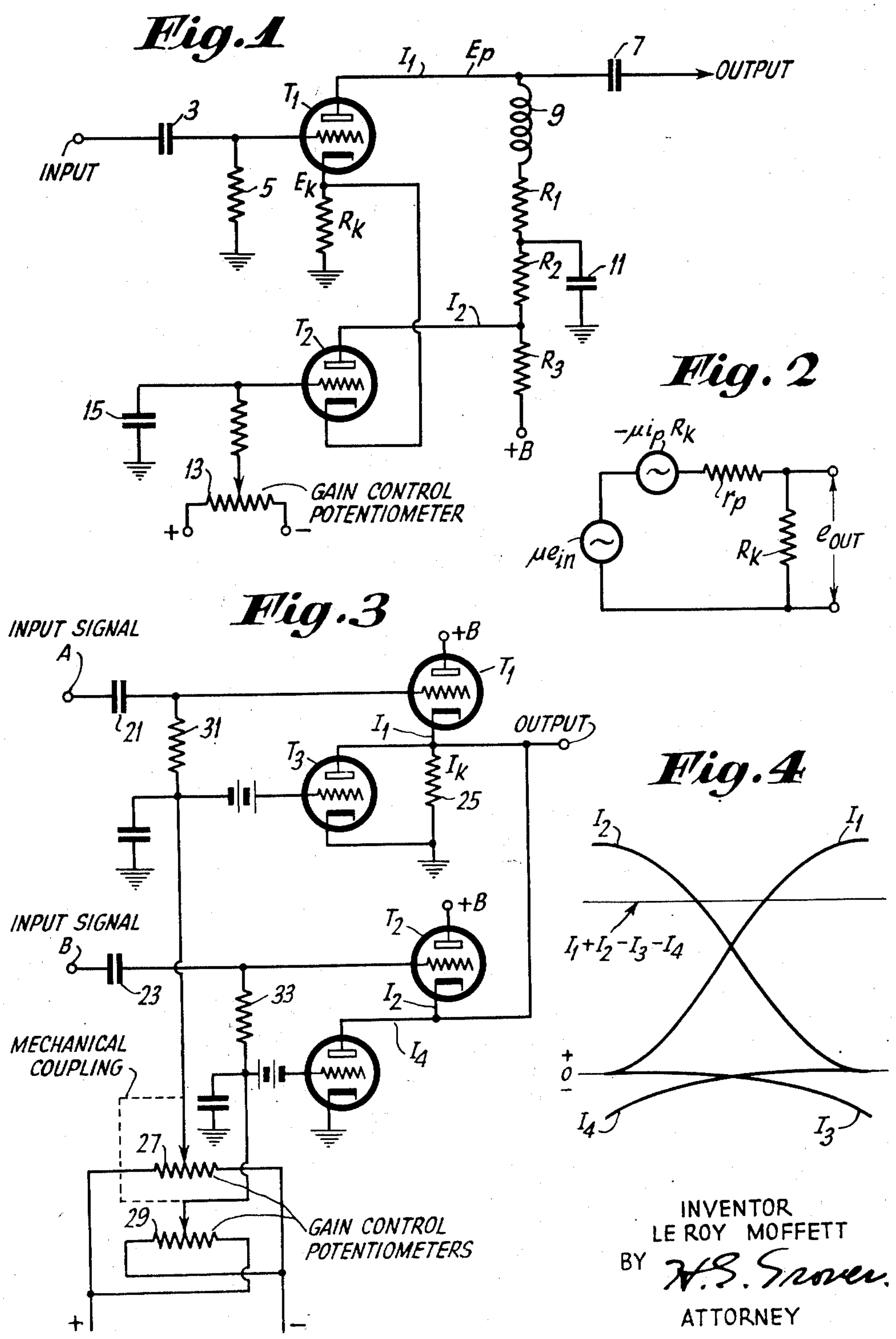
Figure 2 shows schematically the equivalent circuit diagram of the popular cathode follower circuit.
Figure 3 shows another preferred form of this invention in circuit diagram and illustrates the employment of the teachings of this invention for mixing signals involving a plurality of signal channels.
Figure 4 shows graphically the operation of the preferred form of this invention shown in Figure 3.

Turning now in more detail to Figure 1, there is shown a tube $T_1$ having an input circuit including a capacity 3 and a grid resistor 5. There is also provided an output circuit for tube $T_1$ which includes a plate load resistance including resistors $R_1$, $R_2$ and $R_3$, and an output coupling capacity 7.

A series inductance 9 is included to improve the high frequency response. The reason the high frequency response is improved by the inclusion of a series inductance is that the effective load impedance is now held nearly constant at the higher frequencies. The combination of $R_1$ and inductance 9 compensate for the shunting effect of the tube $T_1$ capacity and other circuit capacities.

Condenser 11 is employed as a by-pass condenser to block signal but pass the control exercised by tube $T_2$.

A cathode resistor $R_K$ is employed to obtain the required grid bias for tube $T_1$. As is well known in the art, the tube current flowing through cathode resistor $R_K$ develops a potential drop across resistor $R_K$. The cathode of tube $T_1$ is therefore held at a positive potential with respect to ground by the drop which effectively places the grid negative with respect to the cathode by the amount of the voltage drop, because the grid of tube $T_1$ is substantially at ground potential. The value of the cathode resistor is determined by the bias required and the plate current which flows at the value of bias, as found from the tube characteristic curves. Normally resistance $R_K$ is shunted by a capacitor to provide a low impedance path to ground for the A.-C. component of the plate current which results from an A.-C. input signal to the grid. A small by-pass condenser can be employed across cathode resistor $R_K$ to improve the high frequency response of the amplifier and still secure degeneration at mid, low and D.-C. ranges of signal and control voltages. However, in this preferred form of the invention, such a cathode by-pass condenser is not employed. The omission of the by-pass condenser causes negative feed-back or degeneration. Although degeneration reduces the gain in an amplifier, an object of this invention is to control the amount of gain and not to provide amplification. Furthermore, the inclusion of degeneration improves the operation stability and reduces distortion in the amplifier.

It will be remembered that a primary object of the invention is to provide a control of gain and to maintain substantially constant the average or no signal plate voltage or output voltage.

A brief reference to fundamental properties of vacuum tubes will aid in the explanation of the operation of one preferred form of this invention.

The mutual conductance $G_m$ (or, as it is sometimes called, the transconductance $G_m$) is defined as the rate of change of plate current with respect to a change in grid voltage. If therefore the grid voltage is changed by $\Delta E_g$, the resulting plate-current change $\Delta I_p$ is related to the mutual conductance by the equation $$\Delta I_p = \Delta E_g G_m$$

$$G_m = \frac{\delta I_p}{\delta E_g} = \frac{dI_p}{dE_g} \quad E_p \text{ constant}$$

where $E_p$ is the plate voltage.

In any tube the mutual conductance $G_m$ depends primarily upon the plate current, and only a small extent upon the combination of grid and plate voltages used to produce this current. The mutual conductance $G_m$ also increases as the plate current is increased. This follows from the fact that $$G_m = \frac{\mu}{R_p}$$

where $G_m$ is expressed in mhos
$\mu$=amplification factor of tube
$R_p$=plate resistance (dynamic) in ohms The amplification factor remains substantially constant. Therefore the mutual conductance varies inversely as $R_p$.

Therefore, due to the fact that the mutual conductance $G_m$ increases as the plate current is increased, and assuming a constant plate voltage, a change in grid bias in a positive direction will lower the dynamic plate resistance $R_p$ or increase the mutual conductance $G_m$. An increase in mutual conductance $G_m$ will cause the same change in grid voltage $E_g$ to have a greater effect on the plate current $I_p$. Increasing the grid bias in a positive direction therefore increases the amount of change in plate current $I_p$ with a given change in grid voltage $E_g$.

It will be remembered, however, that an increased plate current $I_p$ causes a greater drop in the load resistor and consequently a drop in plate voltage $E_p$.

An auxiliary tube $T_2$ is connected in the circuit to perform two functions. It changes the bias on tube $T_1$ and at the same time compensates for the change in plate voltage. The cathode of tube $T_2$ is connected to the cathode of tube $T_1$. The anode of tube $T_2$ is connected to the load resistor intermediate its ends, in this circuit between resistances $R_2$ and $R_3$. The control electrode of tube $T_2$ is connected to a variable bias source such as the potentiometer 13 with an associated by-pass condenser 15.

Tube $T_2$ functions to control the bias of tube $T_1$ and compensate for changes in plate voltage as follows:

When the gain control potentiometer 13 is moved in a positive direction, tube $T_2$ draws more current. $E_K$, the potential of the cathodes, increases in a positive direction and therefore increases in a negative direction the bias on the grid of tube $T_1$. This results in a lowering of the gain of tube $T_1$. Furthermore, the increased current through tube $T_2$ causes a greater voltage drop in resistance $R_3$ to compensate for the decreased drop in resistances $R_1$, $R_2$ and $R_3$ due to the reduced plate current in tube $T_1$ upon an increased negative grid bias.

Conversely, when the gain control potentiometer 13 is moved in a negative direction, tube $T_2$ draws less current. $E_K$, the potential of the cathodes, decreases. This decreases the negative bias on the grid of tube $T_1$. The gain of tube $T_1$ is increased. Furthermore, the decreased current through tube $T_2$ causes a smaller voltage drop in resistor $R_3$ to compensate for the greater drop in resistances $R_1$, $R_2$ and $R_3$ due to the greater plate current in tube $T_1$ upon a lesser negative grid bias.

Although the changes in impedance of tube $T_2$ change the effective resistance of the cathode resistor and therefore the amount of degeneration, the effect on the overall gain of the circuit due to the change in degeneration is small and may be omitted from consideration.

Assuming practical values for resistances $R_1$ and $R_2$, resistance $R_3$ may be found by solving the following equation:

$$R_3=\frac{(R_1+R_2)I_{1b}-(R_1+R_2)I_{1a}}{I_{1a}+I_{2a}-I_{1b}+I_{2b}}$$

where $I_{1a}$, $I_{2a}$=plate currents for minimum gain
$I_{1b}$, $I_{2b}$=plate currents for maximum gain Turning now to Figure 2, there is shown the equivalent circuit for the cathode follower principle employed in the circuit diagram in Figure 3. The signal applied between grid and ground is represented by an equivalent generator with an output voltage of $\mu e_{in}$. The degenerative voltage developed across the cathode resistor is represented by an equivalent generator with an output voltage of $-\mu i_p R_k$. The minus sign indicates that the degeneration reduces the voltage effective in driving current through the tube. Since the net voltage acting in the circuit is $$\mu e_{in}-\mu i_p R_k$$

the currents which flows in the output is $$i_p=\frac{\mu e_{in}-\mu i_p R_K}{r_p+R_K}=\frac{\mu e_{in}}{r_p+R_K(\mu+1)}$$

The output voltage is $$e_{R_K}=i_p R_K=\frac{\mu e_{in} R_K}{r_p+R_K(\mu+1)}$$

$$\text{gain}=\frac{e_{R_K}}{e_{in}}=\frac{\mu R_K}{r_p+R_K(\mu+1)}$$

where $\mu$ is the amplification factor of the tube, $R_K$ is the resistance in the cathode circuit and $r_p$ is the A.-C. plate resistance of the tube. As the denominator is always greater than the numerator, it is evident that the gain of the cathode follower is always less than unity.

Changes in $e_{in}$ must necessarily appear partly as a change in the bias in order to produce a change in plate current, and only the remainder of the input voltage is available to appear at the output.

A change in voltage across $R_K$ is caused by a change in plate current resulting from a signal on the grid. This change is in the same direction as the applied signal, and therefore no polarity inversion results. It will be understood that polarity inversion is normally obtained in ordinary amplifier circuits.

It might be added that cathode follower systems have several advantages, one of the advantages being that the effective input capacitance between grid and ground is less than that for the same tube used as a conventional amplifier. This is because the degeneration reduces the effective input voltage below the applied value, causing less current to flow through the tube capacitances. Furthermore, because of the high constant input impedance, the cathode follower has negligible load effect on the circuit employed to drive it. The output impedance of a cathode follower is extremely low and may be employed directly for feeding low impedance circuits.

Figure 3 shows by circuit diagram the employment of one form of this invention involving cathode follower systems.

Signal A is applied to tube $T_1$ through condenser 21. Signal B is applied to tube $T_2$ through condenser 23.

Both tubes $T_1$ and $T_2$ employ a common cathode resistor 25.

Auxiliary control tubes $T_3$ and $T_4$ are connected in parallel with the common cathode resistor 25 such that the anodes of tubes $T_3$ and $T_4$ are connected to the cathodes of tubes $T_1$ and $T_2$ and the cathodes of tubes $T_3$ and $T_4$ are connected to a point of fixed potential or ground. This effectively places the impedance of tubes $T_3$ and $T_4$ in parallel with the common cathode resistor 25.

The impedance of tubes $T_3$ and $T_4$ is controlled by varying their grid bias in potentiometers 27 and 29 whose action is mechanically coupled together as illustrated.

A change in bias of tubes $T_1$ and $T_2$ is employed for changing their gain. The effect of changed bias on tubes $T_1$ and $T_2$ of Figure 2 is similar in effect to that explained in detail in connection with the gain control exercised in the circuit illustrated in Figure 1.

The change in bias on tubes $T_1$ and $T_2$ of Figure 3 in opposite directions is obtained from potentiometers 27 and 29 through grid resistors 31 and 33, respectively.

A brief reference to the graph illustrated in Figure 4 will explain the operation of the circuit shown in Figure 3 in keeping constant the average or no signal voltage in the output circuit. The current through tube $T_1$ is illustrated as $I_1$, that of tube $T_2$ as $I_2$, tube $T_3$ as $I_3$, and tube $T_4$ as $I_4$.

The systems shown by circuit diagram in Figure 3 may be employed for lap dissolves, the current of one control $T_1$, for example, is increased as the current on the second control tube $T_2$ is decreased. Near the middle range of these currents, the currents add up to substantially a constant value, however, near cut-off bias the tube being cut off will decrease its plate current much less than the other tube picks up plate current. This is due to remote cut-off characteristics of vacuum tubes. The net result is a change of current $I_K$ through the common cathode resistor $R_K$. Two auxiliary tubes $T_3$ and $T_4$ compensate for the remote cut-off characteristics of the control tubes $T_1$ and $T_2$. The direction of the current of $T_3$ and $T_4$ through $R_K$ is opposite to that of $T_1$ and $T_2$, therefore $I_K$ is equal to $$I_1+I_2-I_3-I_4$$

and if the tube characteristics are properly matched, will hold $I_K$ and thus $E_K$ constant. This is clearly indicated in the graph shown in Figure 4.

Figure 5:
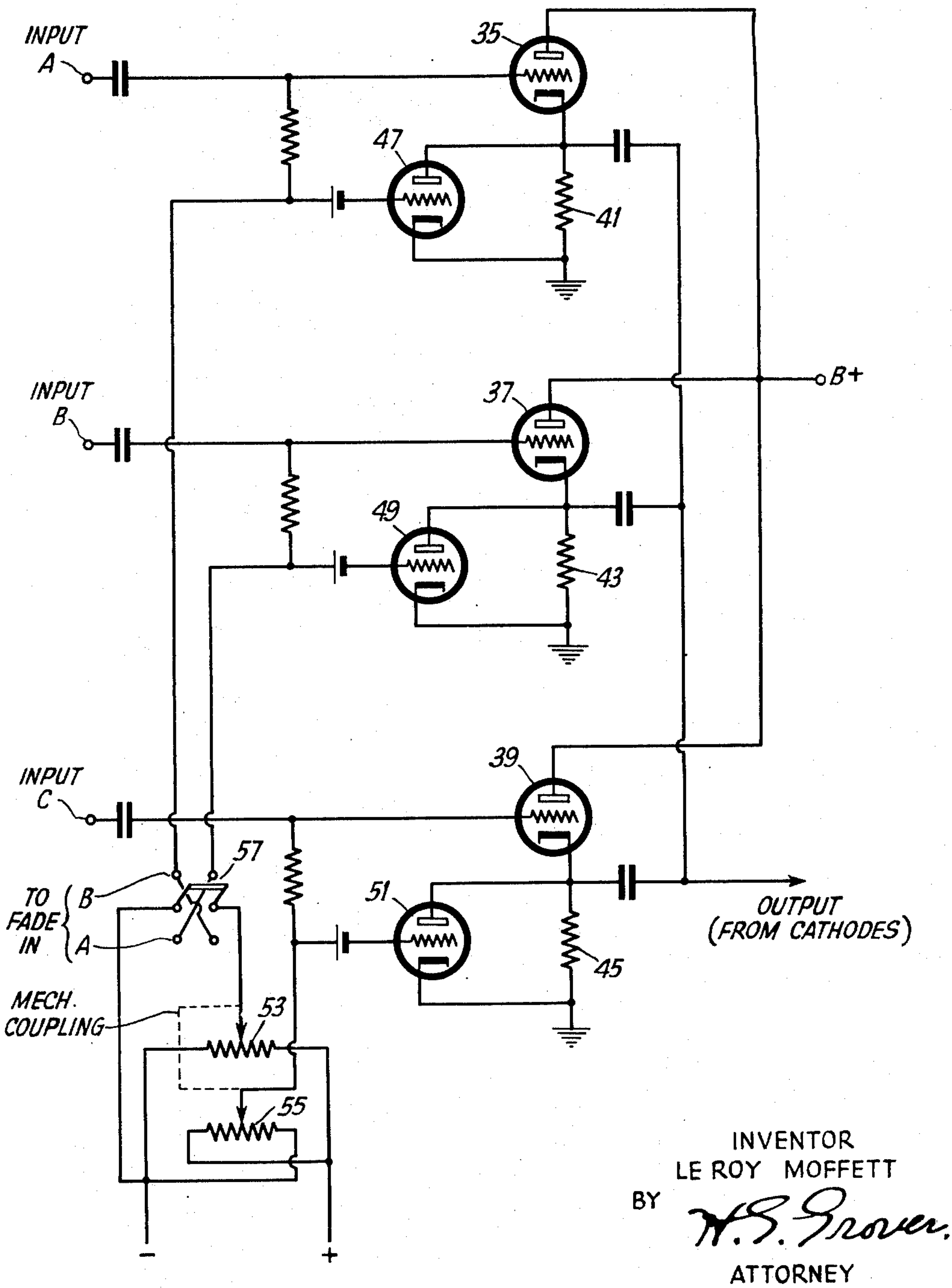
Figure 5 shows by circuit diagram still another form of this invention.

Turning now to Figure 5, there is shown another form of this invention wherein "lap dissolve" between more than two different signal input circuits may be controlled. There is shown in Figure 5 an input A to be impressed on the control electrode of tube 35, input B to be impressed on the control electrode of tube 37, and input C to the control electrode of tube 39. There is a separate cathode resistor for each of the tubes 35, 37 and 39. For purposes of explanation, the separate cathode resistors will be designated as resistor 41 for tube 35, resistor 43 for tube 37, and resistor 45 for tube 39.

Auxiliary tubes 47, 49 and 51 are connected in parallel with cathode resistors 41, 43 and 45, respectively.

In accordance with the explanation given above for the circuits illustrated in Figures 1 and 3, the gain of tubes 35, 37 and 39 may each be controlled by varying their grid bias potentials. By increasing the negative grid bias potential, the gain of the tube may be reduced substantially.

It will be remembered, however, that a change in biasing potential will cause a change in the direct current voltage component in the output circuit, and although such change is partially compensated for by the opposite change in direct current voltage output component of the associated channel, the compensation is not complete, as explained in connection with the circuit diagram of Figure 3 and the graph of Figure 4. The lack of complete compensation may be sufficient to cause objectionable distortion under certain circumstances. This change in direct current voltage component in the output circuit is compensated for in each of the signal channels A, B and C by the auxiliary tubes 47, 49 and 51, respectively.

Dual potentiometers 53 and 55, which are preferably mechanically coupled together, provide the desired biasing potentials in a manner similar to that explained regarding the circuit shown in Figure 3 above.

The operation of the circuit shown in Figure 5 may best be explained by illustration. For example, assume that it is desired to fade from the signal applied to input A to the signal applied to input C and then fade from the signal applied to input C to the signal applied to input B. A double pole double throw switch 57 will be in the downward position. The pointers of the potentiometers 53 and 55 will be at the right end of their respective resistance elements. By moving the pointers of the potentiometers 53 and 55 to the left, the signal applied to input A will fade out, while the signal applied to input C is faded in. Switch 57 is then thrown upward, and the potentiometer pointers are moved to the right. This will cause the signal applied to input C to fade out and the signal applied to input B to fade in.

Other fading combination possibilities become apparent.

During the change in position of the pointers of potentiometers 53 and 55, it will be seen that the bias potential applied to the control electrodes of tubes 35, 37 and 39 will be changed to such an extent that the current flowing through each of the tubes will vary widely. Even though the change in current is in opposite direction and therefore the effect on the output circuit is somewhat balanced out, there still remains an irregularity which is corrected by the simultaneous change in impedance of auxiliary tubes 47, 49 and 51. For example, when the bias potential of tube 35 is increased in a positive direction, thus tending to cause a rise in potential of its associated cathode, the impedance of tube 47 is decreased by the more positive biasing potential applied to its control electrode. This tends to reduce the positive potential of the cathode of tube 35 to such a degree that the curvature in the tube characteristic curve is compensated for as illustrated in detail in the graph shown in Figure 4. Similar action takes place in the circuits including tube 37 and auxiliary tube 49 and the circuit including tube 39 and its associated auxiliary tube 51.

Although the circuit shown in Figure 5 is illustrated employing a cathode follower output circuit, a plate circuit output having a uniform direct current voltage component regardless of channel switching or fading may be had by compensating in the plate circuit for direct current voltage changes due to switching, in accordance with the system shown and described in the circuit illustrated in Figure 1.

Having thus described the invention, what is claimed is:

1. A signal mixer comprising in combination, a pair of amplifier tubes each having a control electrode, said pair of tubes having a common cathode follower output circuit, a pair of control tubes, each having a control electrode, said control tubes both connected in parallel with said output circuit, a source of control electrode bias, a mechanically operated variable resistance connected between said source of bias and one of said amplifier tubes and one of said control tubes, a second mechanically operated variable resistance connected between said source of bias and the other of said amplifier tubes and the other of said control tubes, a mechanical coupling between said mechanically operated variable resistances said mechanical coupling connected to simultaneously change the resistance value of said resistances in opposite directions.

2. A television image signal fader comprising in combination, a pair of amplifier tubes having separate input circuits and common cathode follower output circuits, a pair of control tubes, each of said control tubes connected in parallel with said output circuits, a source of bias for said tubes, a pair of means mechanically coupled differentially to each other and to a single control means for simultaneously changing the control electrode bias on one of said amplifier tubes and on one of said control tubes in one direction and at the same time simultaneously changing the control electrode bias on the other of said amplifier tubes and the other of said control tubes in the other direction.

LE ROY MOFFETT.

REFERENCES CITED

The following references are of record in the file of this patent:

UNITED STATES PATENTS

| Number | Name | Date |
|---|---|---|
| 2,069,809 | Armstrong | Feb. 9, 1937 |
| 2,227,056 | Blumlein et al. | Dec. 31, 1940 |
| 2,244,239 | Blumlein et al. | June 3, 1941 |
| 2,284,102 | Rosencrans | May 26, 1942 |
| 2,363,985 | Moser | Nov. 28, 1944 |
| 2,412,279 | Miller, Jr. | Dec. 10, 1946 |
| 2,485,665 | Shepherd | Oct. 25, 1949 |

FOREIGN PATENTS

| Number | Country | Date |
|---|---|---|
| 485,854 | Great Britain | May 25, 1938 |
| 540,834 | Great Britain | Oct. 31, 1941 |